US012012026B2

(12) United States Patent
Hebert et al.

(10) Patent No.: US 12,012,026 B2
(45) Date of Patent: Jun. 18, 2024

(54) ENERGY ABSORBING TABLE FOR VEHICLES

(71) Applicant: Airworthy, Inc., Anaheim, CA (US)

(72) Inventors: Del A. Hebert, Huntington Beach, CA (US); James V. Rouleau, New Richmond, WI (US)

(73) Assignee: Airworthy, Inc., Anaheim, CA (US)

( * ) Notice: Subject to any disclaimer, the term of this patent is extended or adjusted under 35 U.S.C. 154(b) by 0 days.

(21) Appl. No.: 18/210,993

(22) Filed: Jun. 16, 2023

(65) Prior Publication Data

US 2023/0322141 A1 Oct. 12, 2023

Related U.S. Application Data

(63) Continuation of application No. 17/493,536, filed on Oct. 4, 2021, now Pat. No. 11,718,215.

(51) Int. Cl.
*B60N 3/00* (2006.01)
*B61D 37/00* (2006.01)

(52) U.S. Cl.
CPC .............. *B60N 3/001* (2013.01); *B61D 37/00* (2013.01)

(58) Field of Classification Search
CPC ........................... B60N 3/001; B60N 2/42709; B60N 2/42727; B61D 37/00
See application file for complete search history.

(56) References Cited

U.S. PATENT DOCUMENTS

| 8,297,204 | B1 * | 10/2012 | Giannoccora | A47B 13/081 108/42 |
| 9,580,085 | B2 * | 2/2017 | Schmidt | B61D 37/00 |
| 10,569,686 | B2 * | 2/2020 | Le Corre | B60N 2/4214 |
| 10,829,021 | B2 | 11/2020 | Mühlebach | |
| 11,465,542 | B2 * | 10/2022 | Burggraf | B60N 2/42709 |
| 2011/0206894 | A1 * | 8/2011 | Tsai | B32B 3/02 428/116 |
| 2015/0366337 | A1 * | 12/2015 | Luebke | A47B 23/04 108/167 |

(Continued)

FOREIGN PATENT DOCUMENTS

| AT | 521048 A4 * | 10/2019 | .......... B60N 2/4214 |
| DE | 9206638 U1 | 8/1992 | |

(Continued)

*Primary Examiner* — Hanh V Tran
(74) *Attorney, Agent, or Firm* — LOZA & LOZA, LLP; David S. Sarisky

(57) ABSTRACT

An energy absorbing table includes a support assembly and a table assembly. The support assembly includes a sidewall support that mounts to a sidewall, a support post that attaches to a floor, and a table support assembly coupled to the sidewall support and the support post. The table assembly includes a tabletop, at least one energy absorbing assembly, and at least one linear guide assembly. The at least one energy absorbing assembly includes a pair of plunger assemblies secured to the tabletop, and a crush chamber assembly secured to the table support assembly. The crush chamber assembly is configured to slidably receive an end portion of each of the pair of plunger assemblies and includes a pair of energy absorption cores. The at least one linear guide assembly includes a linear guide secured to the tabletop, and a pair of mounts secured to the table support assembly.

12 Claims, 9 Drawing Sheets

(56) References Cited

U.S. PATENT DOCUMENTS

| | | | |
|---|---|---|---|
| 2016/0082984 A1 | 3/2016 | Schmidt | |
| 2019/0084461 A1* | 3/2019 | Le Corre | |
| 2019/0152415 A1* | 5/2019 | Tung | F16F 7/12 |
| 2019/0289995 A1* | 9/2019 | Luebke | A47B 3/083 |
| 2020/0023762 A1* | 1/2020 | Mühlebach | A47B 3/12 |
| 2020/0114938 A1* | 4/2020 | Le Corre | A47B 1/04 |
| 2020/0114939 A1* | 4/2020 | Le Corre | B60N 3/001 |
| 2021/0300226 A1 | 9/2021 | Burggraf | |

FOREIGN PATENT DOCUMENTS

| | | | |
|---|---|---|---|
| DE | 102009034511 A1 * | 1/2011 | B60N 3/001 |
| DE | 102018117399 B3 * | 11/2019 | A47B 13/003 |
| DE | 102019202593 A1 * | 8/2020 | B60N 3/001 |
| DE | 102019208758 A1 * | 12/2020 | B60N 3/001 |
| EP | 1195307 A1 * | 4/2002 | B60N 3/001 |
| EP | 1195307 B1 | 4/2002 | |
| EP | 2574518 A1 | 4/2013 | |
| EP | 3456603 A1 * | 3/2019 | A47B 13/06 |
| ES | 2935481 T3 * | 3/2023 | A47B 13/02 |
| FR | 2994410 A1 | 2/2014 | |
| WO | WO-2014180651 A1 * | 11/2014 | B61D 37/00 |
| WO | 2020033982 A1 | 2/2020 | |
| WO | 2020128940 A1 | 6/2020 | |
| WO | WO-2021001103 A1 * | 1/2021 | B60N 3/001 |

\* cited by examiner

ENERGY ABSORBING TABLE FOR VEHICLES

CROSS-REFERENCE TO RELATED APPLICATION

This application is a continuation of U.S. application Ser. No. 17/493,536, filed on Oct. 4, 2021, now U.S. Pat. No. 11,718,215, entitled "Energy Absorbing Table For Vehicles," which is expressly incorporated by reference herein in its entirety.

TECHNICAL FIELD

The present disclosure relates generally to tables for vehicles, and more particularly, to an energy absorbing table having a tabletop that translates upon impact of a threshold energy level while absorbing a threshold amount of the impact energy.

BACKGROUND

Large transportation vehicles such as trains, buses, boats, may have tables for use for work and entertainment during travel. Generally, such vehicles do not include seatbelts. Because safety restraints are not common and are largely undesirable due to the various advantages of travelling in large vehicles, when one of these vehicles is involved in an accident, passengers may be thrown around the interior of the vehicle and injured by fixtures in the interior of the vehicle.

Tables in large transportation vehicles are generally solidly built to provide a stable work surface and to provide damage resistance due to jolts and vibrations common in vehicles. Because of the solid nature of the tables and the usefulness and proximity of the tables to seating, tables can present a danger to passengers in the case of an accident or emergency stop. In mass transportation vehicles such as trains that commonly have tables, during an accident or sudden stop a passenger seated at a table is likely to be thrown against the edge of a table. The impact of the passenger against the table can result in serious injury to the passenger by the table.

It is desirable to provide a table that reduces the level of impact with passengers that results from sudden movement by the passenger. The concepts disclosed below address these needs and others.

SUMMARY

In one aspect of the disclosure, an energy absorbing table for a vehicle includes a support assembly and a table assembly that is supported by the support assembly. The support assembly includes a sidewall support configured to mount to a sidewall of the vehicle, a support post configured to attach to a floor of the vehicle, and a table support assembly having a first end coupled to the sidewall support and a second end coupled to the support post. The table assembly includes a tabletop, at least one energy absorbing assembly, and at least one linear guide assembly. The energy absorbing assembly includes a pair of plunger assemblies secured to the tabletop, and a crush chamber assembly secured to the table support assembly. The crush chamber assembly is configured to slidably receive an end portion of each of the pair of plunger assemblies and includes a pair of energy absorption cores. Each energy absorption core is aligned with a respective one of the end portions. The linear guide assembly includes a linear guide secured to the tabletop, and a pair of mounts secured to the table support assembly. The pair of mounts are aligned and configured to slidably receive the linear guide.

In another aspect of the disclosure, a table assembly for mounting to a table support assembly includes a tabletop, at least one energy absorbing assembly, and at least one linear guide assembly. The energy absorbing assembly includes a pair of plunger assemblies secured to the tabletop and a crush chamber assembly configured to be secured to the table support assembly. The crush chamber assembly is further configured to slidably receive an end portion of each of the pair of plunger assemblies, and includes a pair of energy absorption cores. Each energy absorption core is aligned with a respective one of the end portions of a plunger assembly. The linear guide assembly has a linear guide secured to the tabletop, and a pair of mounts configured to be secured to the table support assembly. The pair of mounts are aligned and configured to slidably receive the linear guide.

It is understood that other aspects of table assemblies will become readily apparent to those skilled in the art from the following detailed description, wherein various aspects of assemblies are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of table assemblies will now be presented in the detailed description by way of example, and not by way of limitation, with reference to the accompanying drawings, wherein.

DETAILED DESCRIPTION

Figure 1:
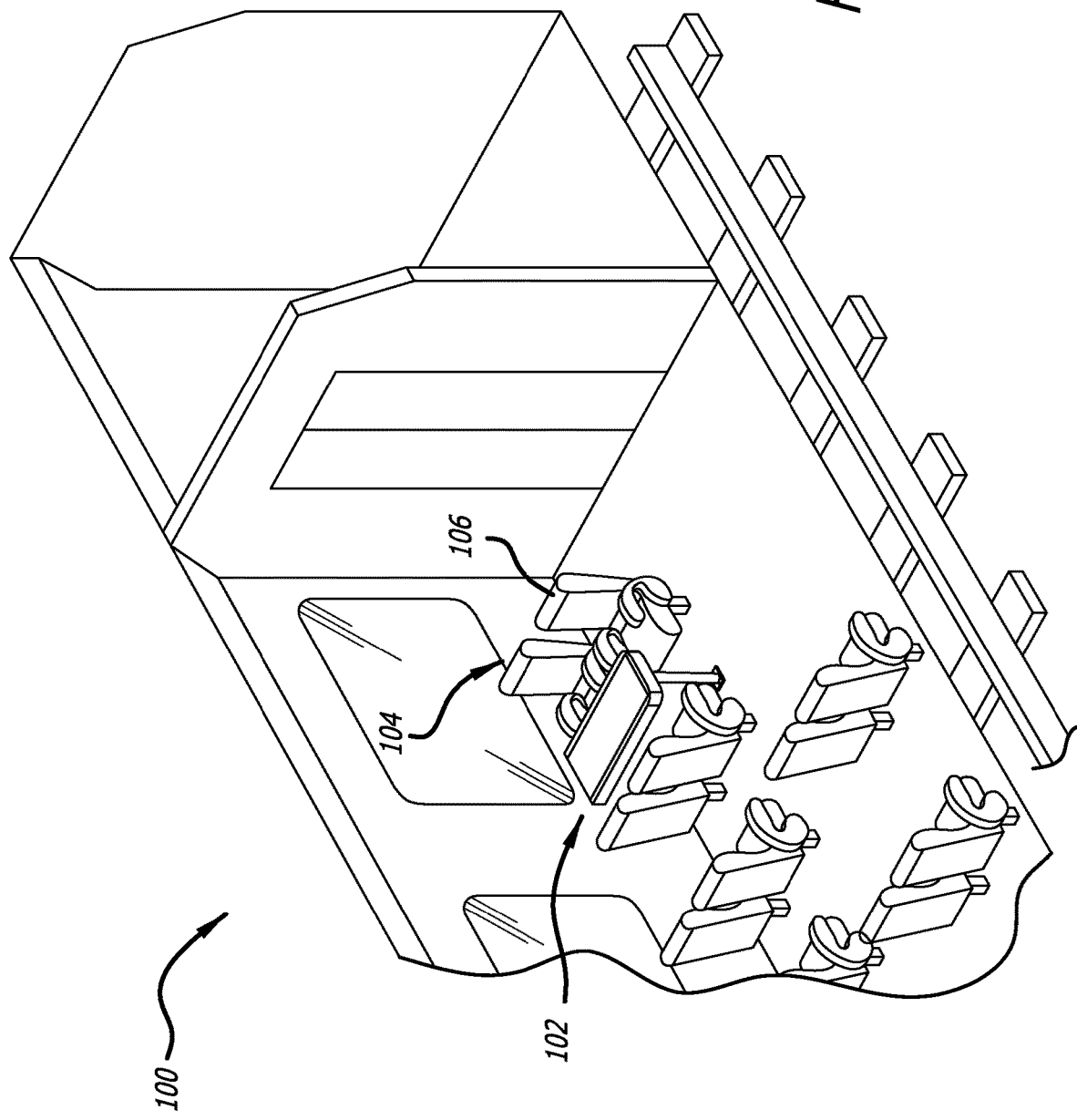
FIG. 1 is a top perspective illustration of an interior of a passenger vehicle, e.g., a railcar, including an energy absorbing table.

With reference to FIG. 1, a passenger vehicle 100 in the form of a railcar includes an energy absorbing table 102 located between opposed pairs of passenger seats 104. The energy absorbing table 102 is configured to displace horizontally, in the direction of the seatbacks 106, upon impact of sufficient force to an edge of the tabletop of the energy absorbing table.

Figure 2:
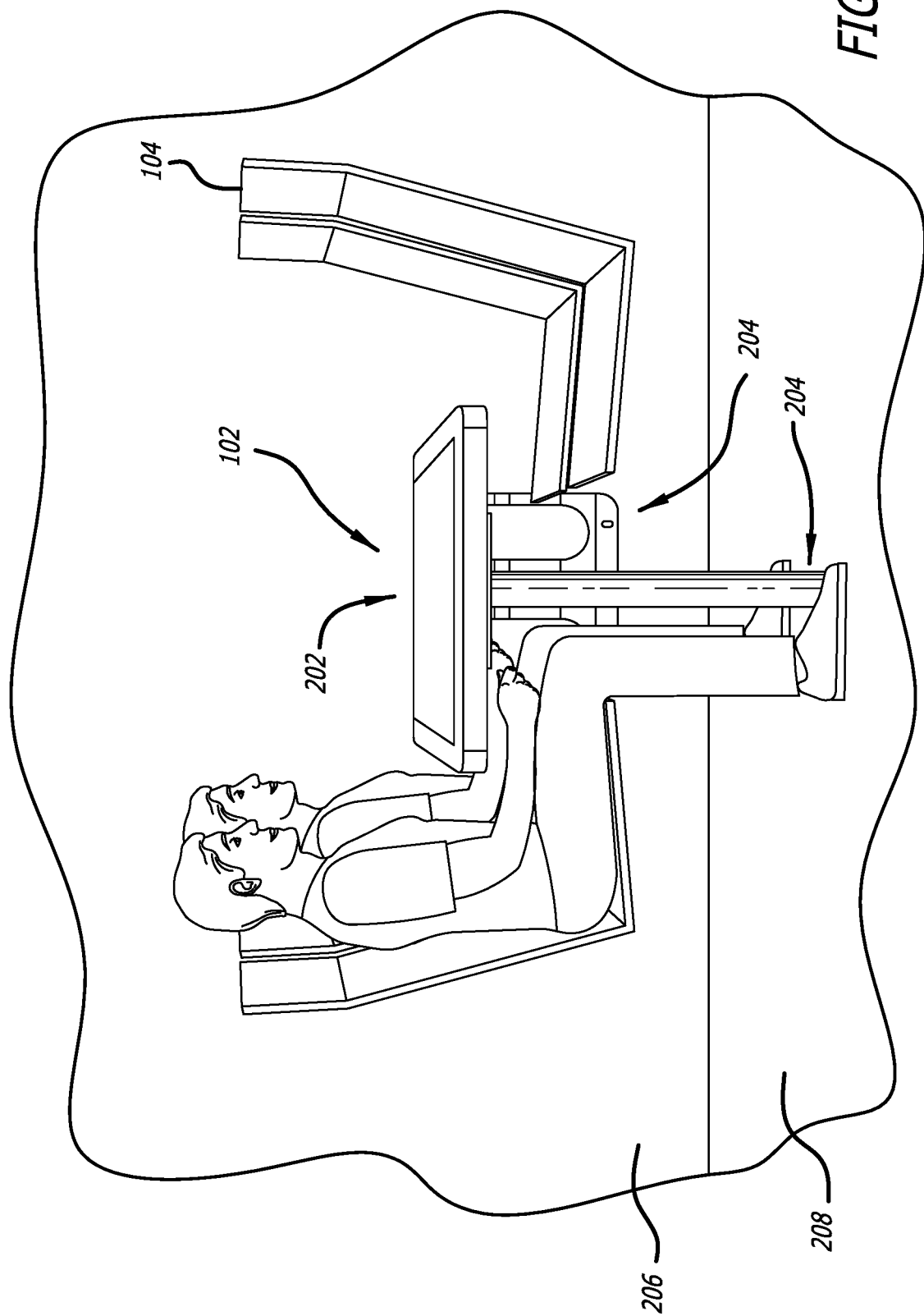
FIG. 2 is a side perspective illustration of an embodiment of the energy absorbing table of FIG. 1 mounted to a sidewall and floor of a passenger vehicle, and with passengers seated at the table.
Figure 3:
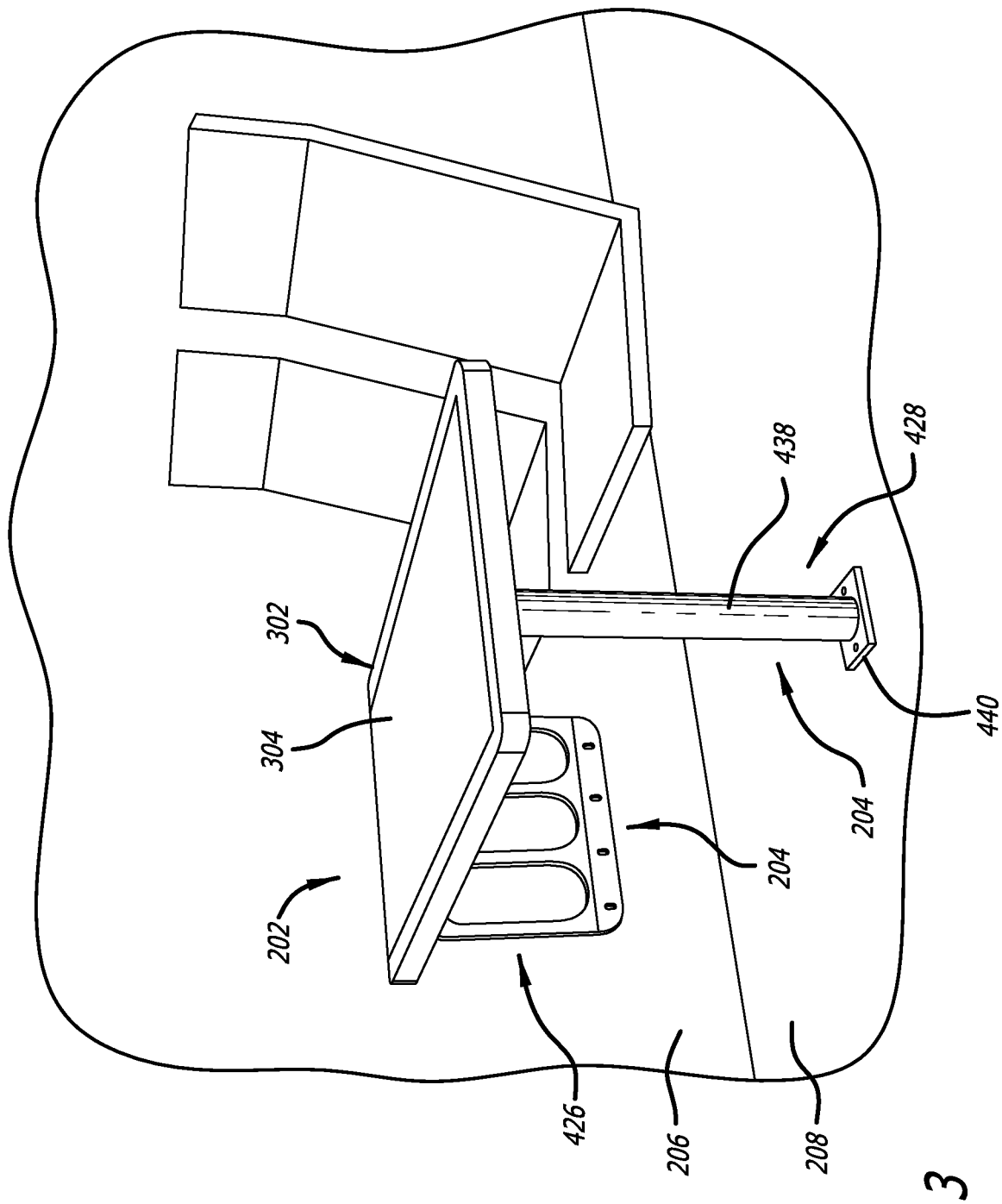
FIG. 3 is a top perspective illustration of the energy absorbing table of FIG. 2 mounted to a sidewall and floor of a passenger vehicle and adjacent two passenger seats, and including a table assembly and a support assembly.

With reference to FIGS. 2 and 3, the energy absorbing table 102 includes a table assembly 202 and a support assembly 204. The support assembly 204 is configured to be mounted to a sidewall 206 and a floor 208 of a passenger vehicle. The table assembly 202 is configured to be secured to the support assembly 204.

Figure 4:
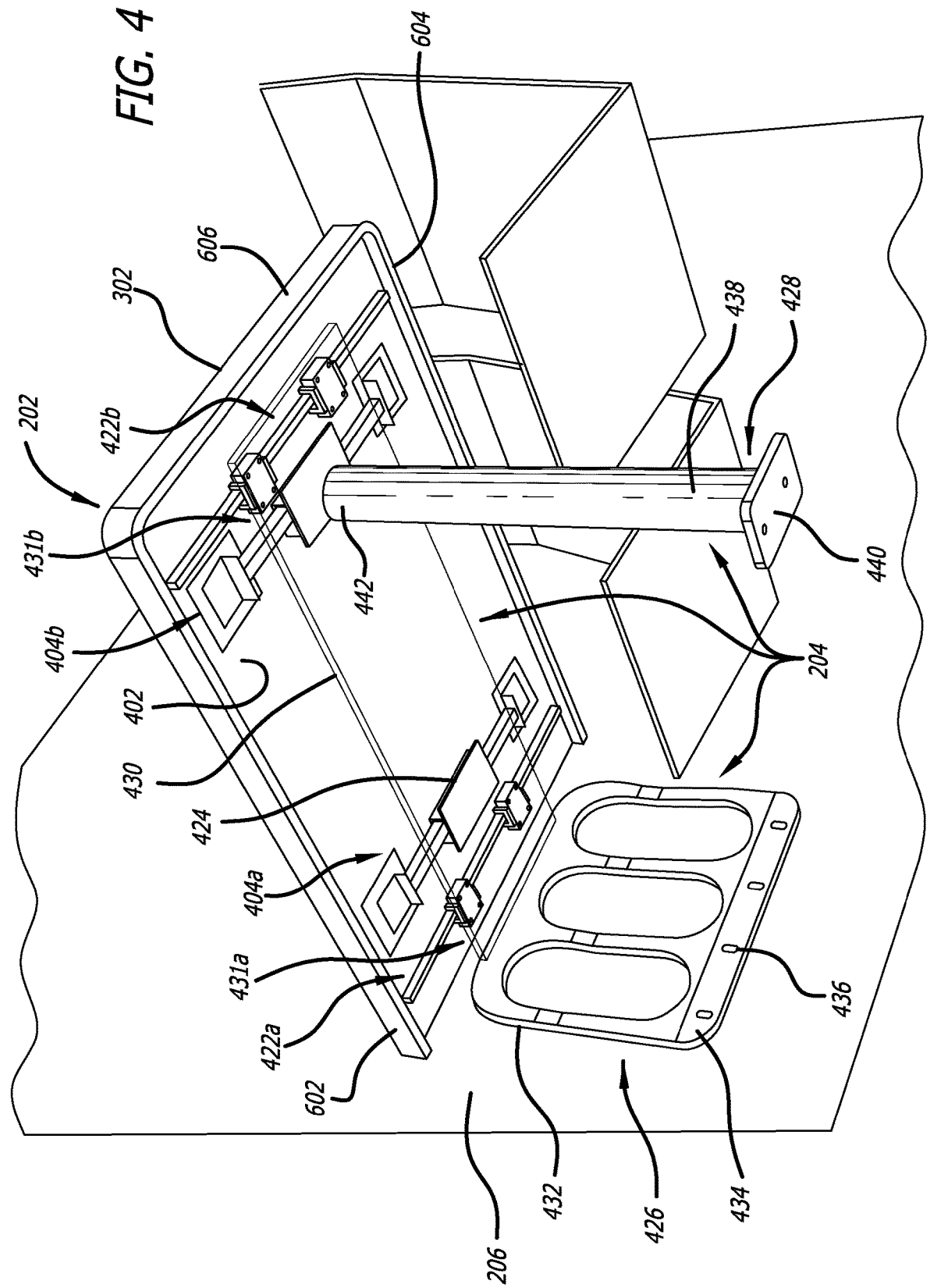
FIG. 4 is a bottom perspective illustration of the energy absorbing table of FIG. 3.
Figure 5:
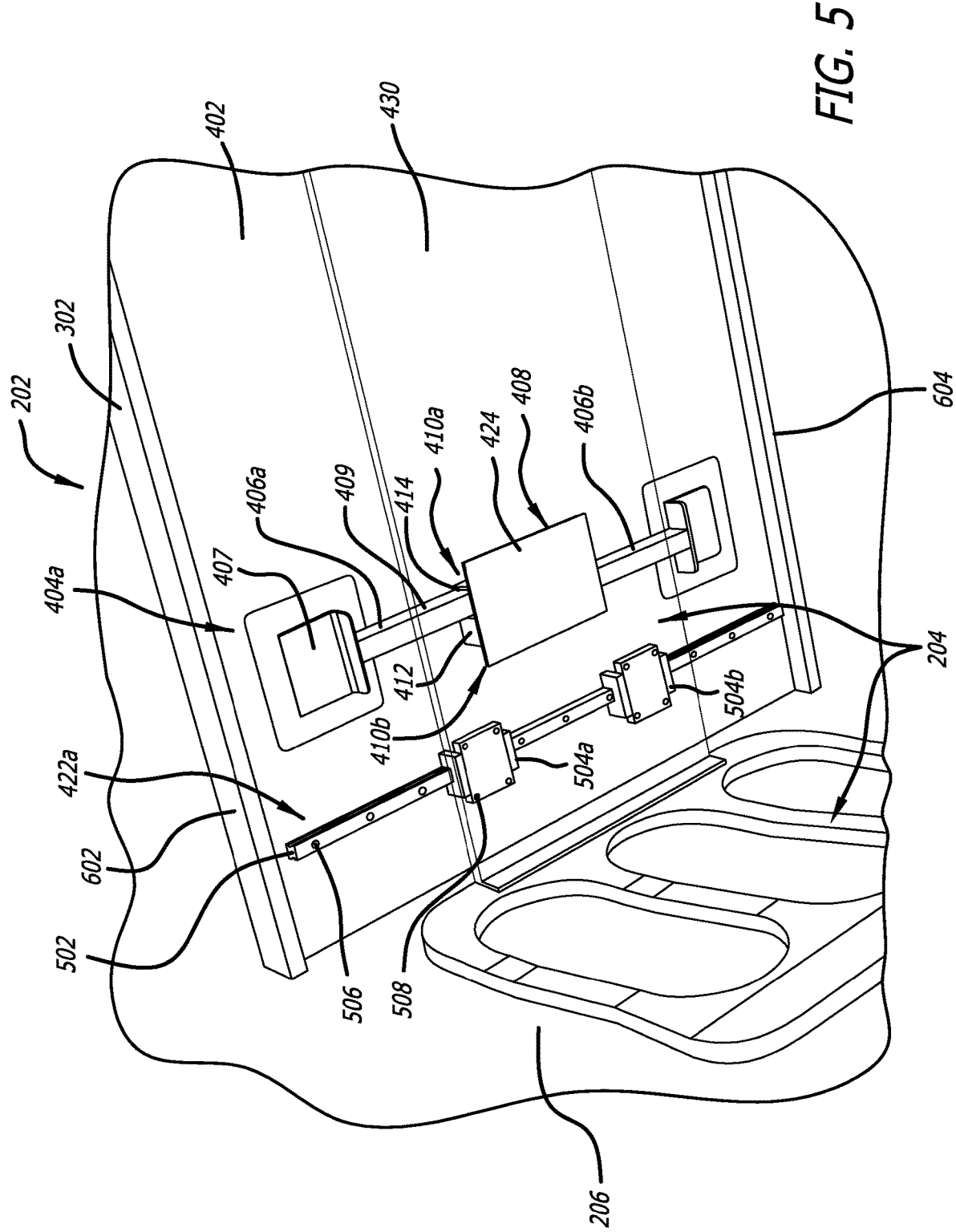
FIG. 5 is a bottom perspective illustration of a portion of the energy absorbing table of FIG. 4 showing energy absorbing components of the table assembly.

With reference to FIGS. 3, 4, and 5, the table assembly 202 includes a tabletop 302 having a top surface 304 and an underneath surface 402. A pair of energy absorbing assemblies 404a, 404b are secured in part to the underneath surface 402, and in part to the support assembly 204. A pair of linear guide assemblies 422a, 422b are also secured in part to the underneath surface 402, and in part to the support assembly 204. With reference to FIG. 6B, in one configuration the tabletop 302 comprises an aluminum skinned composite panel with a bonded edge that extends around three sides of the tabletop to define opposed length edges 602, 604 and a width edge 606.

Note that in FIGS. 4 and 5 (and later in FIG. 8) the part, i.e., the table support assembly 430, of the support assembly 204 to which the energy absorbing assemblies 404a, 404b and linear guide assemblies 422a, 422b are secured in part is shown transparent. This is done in order to show components of the energy absorbing table 102 that are located between the underneath surface 402 of the tabletop 302 and the table support assembly 430.

Figure 6A:
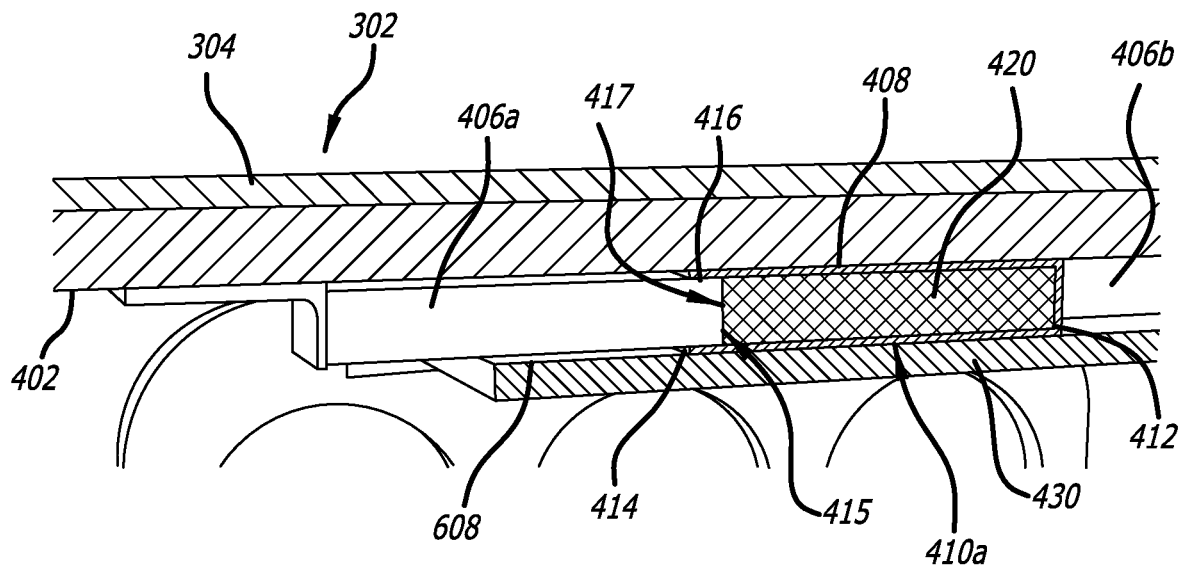
FIG. 6A is a cross-section perspective illustration through a portion of the energy absorbing components of the table assembly.
Figure 6B:
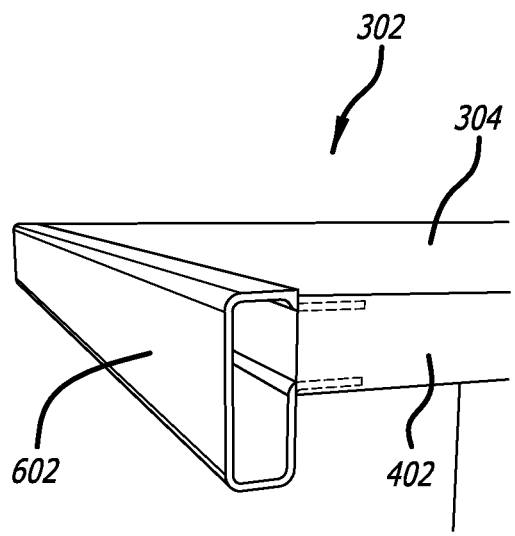
FIG. 6B is a cross-section perspective illustration through a portion of the tabletop of the table assembly.

With reference to FIGS. 5 and 6A, each energy absorbing assembly 404a, 404b includes a pair of plunger assemblies 406a, 406b and a crush chamber assembly 408 with an energy absorption core 420. The pair of plunger assemblies 406a, 406b and crush chamber assembly 408 are formed of a rigid metal material, while the energy absorption core 420 is formed of a flexible, crushable material. Each plunger assembly 406a, 406b includes a bracket 407 and an extension member 409 that extends from the bracket. The crush chamber assembly 408 includes a pair of receptacles 410a, 410b mounted to a base plate 424.

As previously mentioned, the energy absorbing assemblies 404a, 404b are secured in part to the underneath surface 402, and in part to the support assembly 204. To this end, the bracket 407 of each plunger assembly 406a, 406b of each energy absorbing assembly 404a, 404b is secured to the underneath surface 402 of the tabletop 302, while the base plate 424 of each crush chamber assembly 408 of each energy absorbing assembly 404a, 404b is secured to a table support assembly 430 of the support assembly 204. The brackets 407 and base plates 424 may be secured using mounting hardware (not shown).

Continuing with reference to FIGS. 5 and 6A, each receptacle 410a, 410b of the crush chamber assembly 408 has a closed end 412 and an opened end 414. The pair of receptacles 410a, 410b are arranged side-by-side such that the closed end 412 of one is adjacent the opened end 414 of the other. The opened end 414 of each receptacles 410a, 410b is align with and is sized to receive an end portion 416 of a respective one of the plurality of plunger assemblies 406a, 406b. The end portion 416 of the plunger assemblies 406a, 406b comprises a closed end surface 415 that presents a solid surface for abutting contact with an end surface 417 of the energy absorption core 420.

With reference to FIG. 6A, an energy absorption core 420 is inserted in the interior space between the closed end 412 of the receptacle 410a, 410b and the end portion 416 of the plunger assembly 406a, 406b. In some embodiments, the energy absorption core 420 is sized to tightly fit within the interior of the receptacle 410a, 410b. To this end the energy absorption core 420 has cross-section dimensions, e.g., height and width, that are slightly less than the cross-section dimensions of the opened end 414 of the receptacle 410a, 410b into which it is inserted. In one configuration, the cross-section dimensions of the energy absorption core 420 is on the order of 1 millimeter less than the cross-section dimensions of the opened end 414 of the receptacle 410a, 410b. The length of the energy absorption core 420 may be less than, equal to, or slightly greater than the length of the interior length of the receptacle 410a, 410b into which it is inserted.

In cases where the length of the energy absorption core 420 is equal to or slightly greater than the length of the interior of the receptacle 410a, 410b, the energy absorption core may be slightly crushed by the end portion 416 of the plunger assembly 406a, 406b during assembly of the table assembly 202, as the end portion is placed through the opened end 414 of the receptacle. The result of this assembly is the state shown in FIG. 6A. In cases where the length of the energy absorption core 420 is less than the length of the interior of the receptacle 410a, 410b, the length is such that during assembly of the table assembly 202, the end portion 416 of the plunger assembly 406a, 406b is placed immediately adjacent to or in abutting contact with the end of the energy absorption core 420. In one configuration, the energy absorption core 420 comprises an aluminum honeycomb structure, such as 22 PCF TRUSSGRID™, manufactured by Gill Corp.

With reference to FIGS. 4 and 5, each linear guide assembly 422a, 422b includes a linear guide 502 slidably received by or engaged with a pair of mounts 504a, 504b. Slidably engaged with or received by means that the linear guide 502 moves relative to the pair of mounts 504a, 504b. More specifically, the pair of mounts 504a, 504b are fixed in place and the linear guide 502 is configured to slide back and forth along a guiding structure of the mounts 504a, 504b. The linear guide 502 and mounts 504a, 504b are formed of a metal material. As previously mentioned, the linear guide assemblies 422a, 422b are also secured in part to the underneath surface 402 of the tabletop 302, and in part to the support assembly 204. To this end, each the linear guide 502 of a linear guide assembly 422a, 422b is secured to the underneath 402 of the tabletop 302 with mounting hardware 506, while the mounts 504a, 504b of each linear guide assembly 422a, 422b are secured to the table support assembly 430 of the support assembly 204 with mounting hardware 508. The linear guide assemblies 422a, 422b provide stability to the tabletop 302 relative to the table support assembly 430, particularly during translation of the tabletop that may result from impact to the edge 602 of the tabletop.

With reference to FIGS. 3, 4 and 5, the support assembly 204 includes a sidewall support 426, a support post 428, and a table support assembly 430. The sidewall support 426 includes an upper portion 432 and a lower portion 434, each configured to be attached to a sidewall 206 with mounting hardware 436. The support post 428 includes a vertical post 438 and base 440. The base 440 is configured to be attached to a floor 208. The table support assembly 430 is secured to the upper portion 432 of the sidewall support 426 and the upper end 442 of the vertical post 438 and provides a horizontal structure upon which to secure the table assembly 202.

Figure 7:
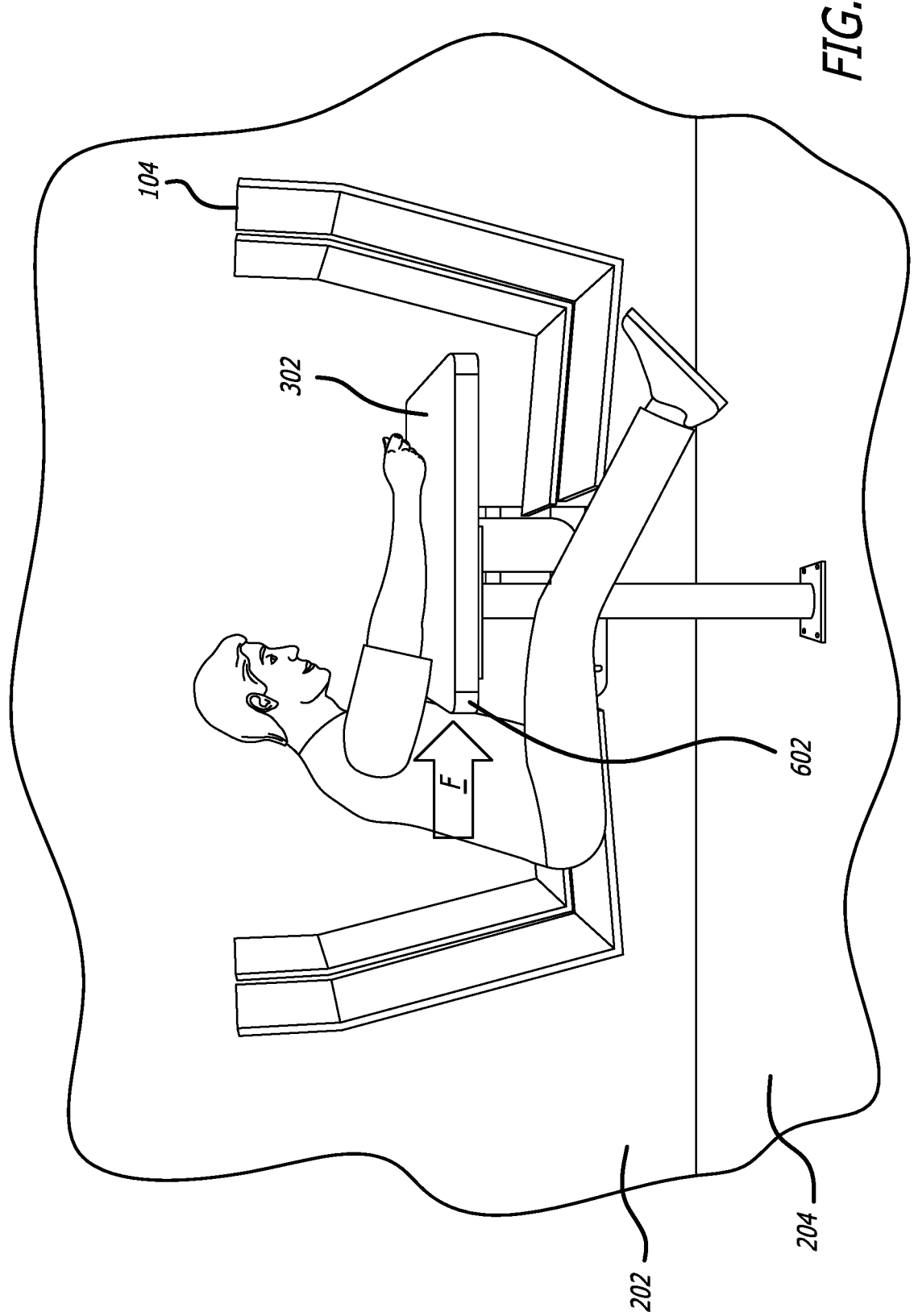
FIG. 7 is a side perspective illustration of a passenger of FIG. 2 after impacting the edge of the energy absorbing table showing forward translation of the tabletop of the table assembly.
Figure 8:
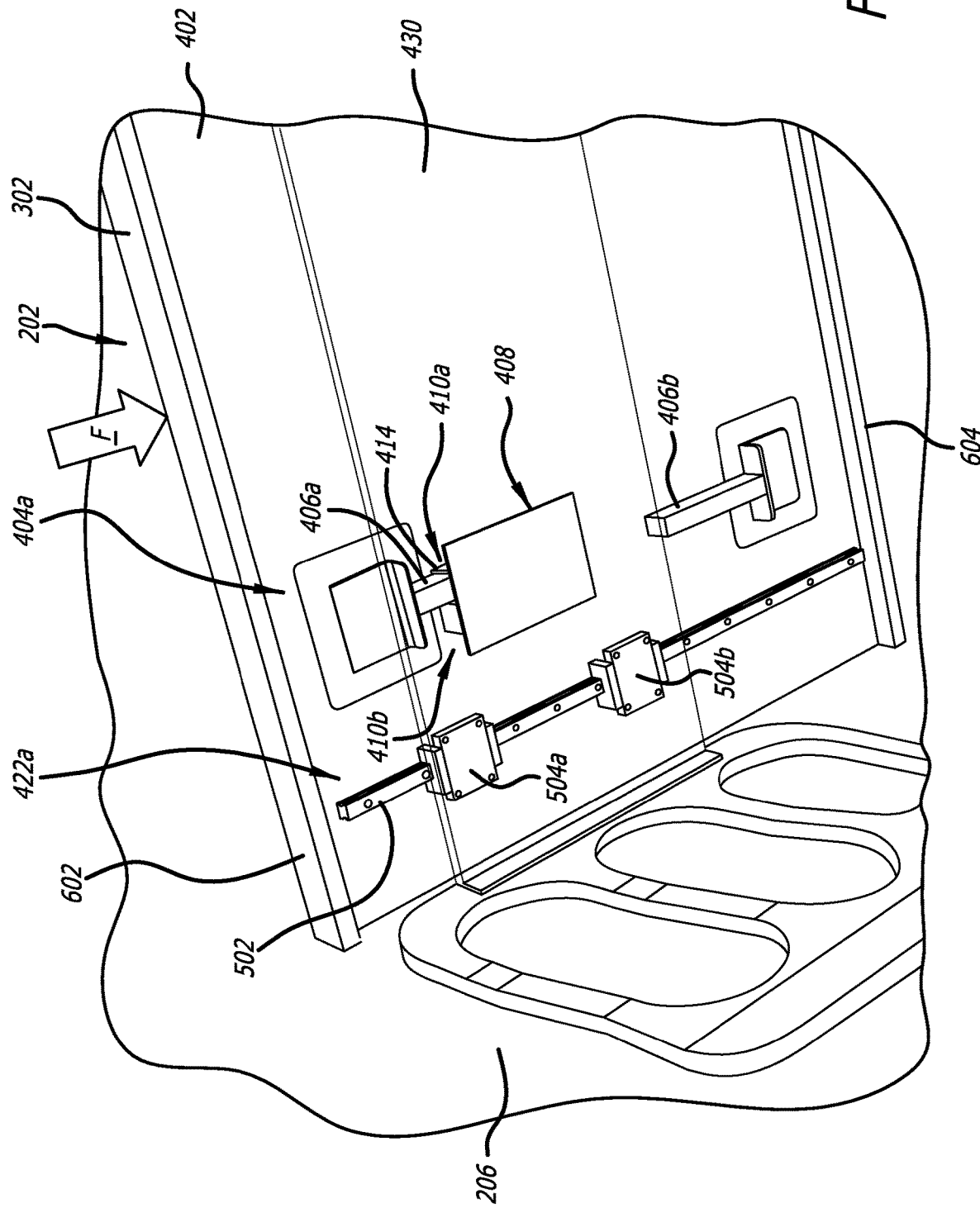
FIG. 8 is a bottom perspective illustration of a portion of the energy absorbing table showing energy absorbing components of the table assembly after passenger impact of FIG. 7.

With reference to FIGS. 7 and 8, the energy absorbing table of FIGS. 1 through 6B is configured such that upon application of a load of sufficient impact force F to a length edge 602 of the tabletop 302, the tabletop (together with the linear guides 502 and relevant plunger assembly 406a, 406b) translates or moves in the direction of the force. A load of sufficient impact force F may result, for example, from a crash that causes a passenger to impact the length edge 602 of the tabletop 302. As shown in FIG. 8, guided, linear translation of the tabletop 302 in the direction of impact is provided by the slidable engagement between the linear guides 502 secured to the tabletop 302 and the mounts 504a, 504b secured to the table support assembly 430.

Figure 9:
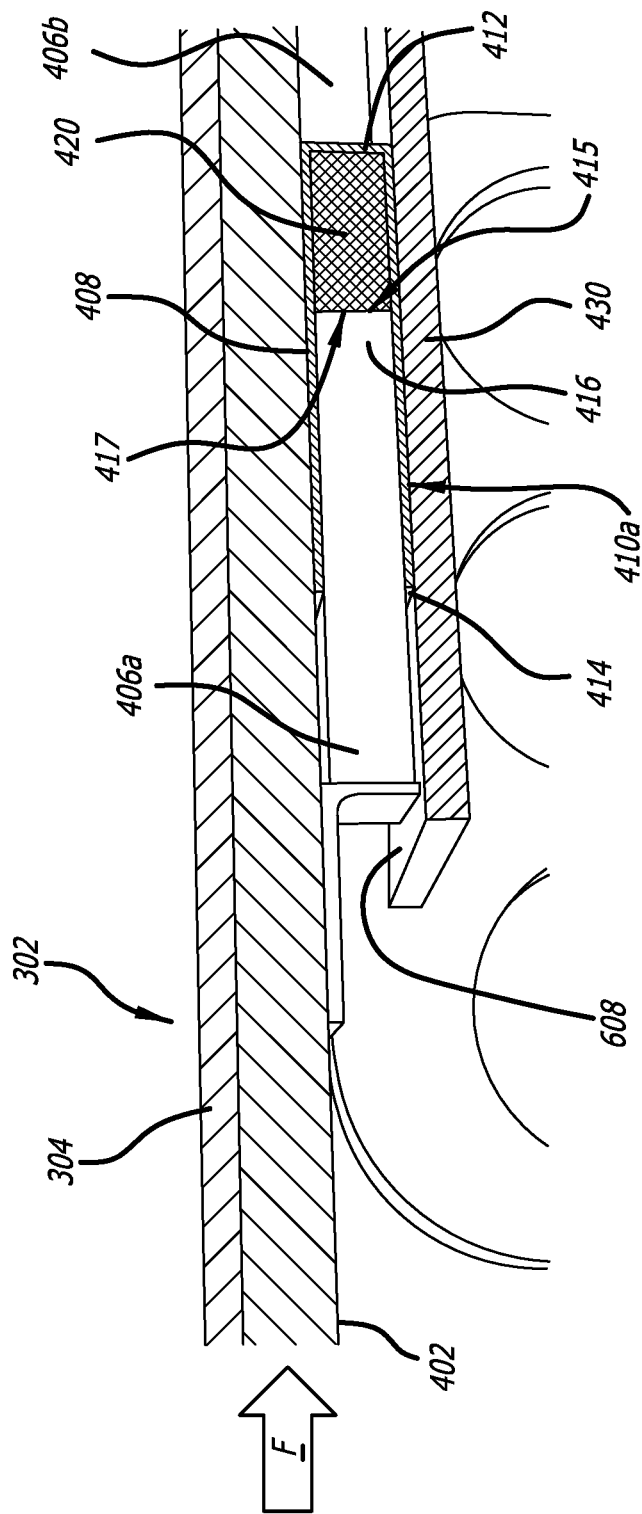
FIG. 9 is a cross-section perspective illustration through a portion of the energy absorbing components of the table assembly after passenger impact of FIG. 7.

With additional reference to FIGS. 8 and 9, guided, linear translation of the tabletop 302 in the above described manner is accompanied by a corresponding translation of the plunger assemblies 406a, 406b secured to the tabletop 302 relative to the receptacle 410a, 410b of crush chamber assembly 408 secured to the table support assembly 430. More specifically, the plunger assembly 406a adjacent the length edge 602 upon which the force F is applied moves further in its associated receptacle 410a, while the plunger assembly 406b adjacent the opposite length edge 604 moves out of its associated receptacle 410b. As shown in FIG. 9, the energy absorption core 420 within the receptacle 410a is crushed by the plunger assembly 406a and thereby absorbs the energy from the impact. The energy from the impact is absorbed and the mass is decelerated within acceptable limits while maintaining compartmentalization of the passengers. In one configuration, the tabletop moves or slides a distance no greater than approximately 6 inches.

Thus, disclosed herein is an energy absorbing table 102 for a vehicle. The energy absorbing table 102 includes a support assembly 204 and a table assembly 202 that is supported by the support assembly. The support assembly 204 includes a sidewall support 426 configured to mount to a sidewall 206 of the vehicle, and a support post 428 configured to attach to a floor 208 of the vehicle. The support assembly 204 also includes a table support assembly 430 having a first end 431a coupled to the sidewall support 426 and a second end 431b coupled to the support post 428. The first end 431a and the second end 431b encompass respective end regions of the table support assembly 430 that include more than the respective edges of the table support assembly. The table support assembly 430 may be mechanically coupled by securing hardware, e.g., bolts, fasteners, etc., to the sidewall support 426 and the support post 428 so as to present a substantially horizontal and level surface.

The table assembly 202 includes a tabletop 302, at least one energy absorbing assembly 404a, 404b, and at least one linear guide assembly 422a, 422b. In the embodiment shown in FIG. 4, the table assembly 202 includes a pair of energy absorbing assemblies 404a, 404b and a pair of linear guide assemblies 422a, 422b. A first energy absorbing assembly 404a and a first linear guide assembly 422a are located in a region of the sidewall support 426, while a second energy absorbing assembly 404b and a second linear guide assembly 422b are located in a region of the support post 428.

In other embodiments, the table assembly 202 may include a single energy absorbing assembly and a single one linear guide assembly, each located toward the center of the length of the tabletop 302. In other embodiments, the table assembly 202 may include more than two energy absorbing assemblies and more than two linear guide assemblies that may be evenly distributed along the length of the tabletop 302.

Each of the one or more linear guide assemblies 422a, 422b includes a linear guide 502 that is secured to the tabletop 302, and a pair of mounts 504a, 504b that are secured to the table support assembly 430. In one configuration, the tabletop 302 includes an underneath surface 402 and the linear guide 502 is secured to the underneath surface, while the table support assembly 430 includes a top surface 608 and the pair of mounts 504a, 504b are secured to the top surface. The pair of mounts 504a, 504b are aligned with and configured to slidably receive the linear guide 502. Slidably received by means that the linear guide 502 moves relative to the pair of mounts 504a, 504b. More specifically, the pair of mounts 504a, 504b are fixed in place and the linear guide 502 is configured to slide back and forth along a guiding structure of the mounts.

Each of the one or more energy absorbing assemblies 404a, 404b includes a pair of plunger assemblies 406a, 406b that are secured to the tabletop 302, and a crush chamber assembly 408 that is secured to the table support assembly 430. In one configuration, the tabletop 302 includes an underneath surface 402 and the pair of plunger assemblies 406a, 406b are secured to the underneath surface, while the table support assembly 430 includes a top surface 608 and the crush chamber assembly 408 is secured to the top surface. The crush chamber assembly 408 is configured to slidably receive an end portion 416 of each of the pair of plunger assemblies 406a, 406b and includes a pair of energy absorption cores 420. In other words, the end portion 416 of each of the pair of plunger assemblies 406a, 406b is slidably received by the crush chamber assembly 408. Slidably received by means that the pair of plunger assemblies 406a, 406b, including their respective end portion 416, move relative to the crush chamber 408. More specifically, the crush chamber 408 is fixed in place and the plunger assemblies 406a, 406b, including their respective end portion 416, are configured and arranged relative to the crush chamber assembly to slide back and forth within structures of the crush chamber. With reference to FIG. 6A, each of the energy absorption cores 420 is aligned with a respective end portion 416 of one of the plunger assemblies 406a, 406b. For example, the energy absorption core 420 may be axially aligned with a plunger assembly 406a to place the end surface of the core in abutting contact with an end surface of the plunger assembly.

In some embodiments, the crush chamber assembly 408 comprises a pair of receptacles 410a, 410b. Each receptacle 410a, 410b has a closed end 412 and an opened end 414. The pair of receptacles 410a, 410b are arranged such that the closed end 412 of a first receptacle 410a is adjacent the opened end 414 of a second receptacle 410b, and the opened end 414 of each receptacle is aligned with and is sized to receive an end portion 416 of a respective one of the pair of plunger assemblies 406a, 406b. In this embodiment, a first core of the pair of energy absorption cores 420 is located in the first receptacle 410a and a second core of the pair of energy absorption cores is located in the second receptacle 410b. The receptacles 410a, 410b have an interior having a width substantially equal to the width of the energy absorption core, a height substantially equal to the height of the energy absorption core, and a length greater than the length of the energy absorption core.

In one configuration, each energy absorption core 420 is configured to absorb at least 6250 in.-lbf of energy when a load applied in a direction of movement of the end portion of a plunger assembly reaches 2250 lbf. Each energy absorption core 420 may comprise a metal material having a honeycomb structure. In one embodiment, each energy absorption core 420 has a height in the range of 0.6 to 1.0 inches, a width in the range of 0.6 to 1.0 inches, and a length in the range of 5.0 to 7.0 inches. Alternatively, the energy absorption cores may be described in terms of its volume, e.g., length×width×height.

In other embodiments, the energy absorbing assemblies 404a, 404b may be configured to absorb different energy levels. For example, energy absorption may be increased by increasing the interior space of the receptacles 410a, 410b and increasing the dimensions or volume of the energy absorption cores 420. Furthermore, while the example embodiment table assembly 202 disclosed is in relation to a table having a length of 44 inches and a width of 28 inches, table assemblies having tables of different sizes may be designed, wherein features of the energy absorbing assemblies 404a, 404b, e.g., receptacle length, cross-section dimensions, etc. may be increased or decreased to absorb different energy levels as may be required by industry standards.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A table comprising:
   a support assembly configured to mechanically couple to one or more structures of a vehicle; and
   a table assembly configured to mechanically couple to the support assembly, the table assembly including a tabletop and at least one energy absorbing assembly having:
   a pair of plunger assemblies secured to the tabletop; and
   a crush chamber assembly secured to the support assembly, the crush chamber assembly configured to receive an end portion of each of the pair of plunger assemblies and including a pair of energy absorption cores, each energy absorption core aligned with a respective one of the end portions; and a pair of receptacles, wherein:
   each receptacle has a closed end and an opened end,
   the pair of receptacles are arranged such that the closed end of a first receptacle is adjacent the opened end of a second receptacle, and
   the opened end of each receptacle is aligned with and is sized to receive an end portion of a respective one of the pair of plunger assemblies.

2. The table of claim 1, wherein each energy absorption core is configured to absorb at least 6250 in.-lbf of energy when a load applied in a direction of movement of the end portion of a plunger assembly reaches 2250 lbf.

3. The table of claim 2, wherein each energy absorption core comprises a metal material having a honeycomb structure.

4. The table of claim 2, wherein each energy absorption core has a height in a range of 0.6 to 1.0 inches, a width in a range of 0.6 to 1.0 inches, and a length in a range of 5.0 to 7.0 inches.

5. The table of claim 4, wherein each energy absorption core is located in a corresponding one of the receptacles and the receptacle has an interior having a width substantially equal to the width of the energy absorption core, a height substantially equal to the height of the energy absorption core, and a length greater than the length of the energy absorption core.

6. The table of claim 1, wherein a first core of the pair of energy absorption cores is located in the first receptacle and a second core of the pair of energy absorption cores is located in the second receptacle.

7. The table of claim 1, wherein that at least one energy absorbing assembly comprises:
   a first energy absorbing assembly located in a region of a first end of the tabletop, and
   a second energy absorbing assembly located in a region of a second end of the tabletop.

8. The table of claim 1, wherein the tabletop comprises an underneath surface and the pair of plunger assemblies are secured to the underneath surface.

9. The table of claim 1, wherein the support assembly comprises a table support assembly having a top surface and the crush chamber assembly is secured to the top surface.

10. A table assembly for mounting to a table support assembly, the table assembly comprising:
    a tabletop; and
    at least one energy absorbing assembly having a pair of plunger assemblies secured to the tabletop, and a crush chamber assembly configured to be secured to the table support assembly, and to receive an end portion of each of the pair of plunger assemblies, the crush chamber assembly including a pair of energy absorption cores, each energy absorption core aligned with a respective one of the end portions; and a pair of receptacles, wherein:
    each receptacle has a closed end and an opened end,
    the pair of receptacles are arranged such that the closed end of a first receptacle is adjacent the opened end of a second receptacle, and
    the opened end of each receptacle is aligned with and is sized to receive an end portion of a respective one of the pair of plunger assemblies.

11. The table assembly of claim 10, wherein a first core of the pair of energy absorption cores is located in the first receptacle and a second core of the pair of energy absorption cores is located in the second receptacle.

12. The table assembly of claim 10, wherein the tabletop comprises an underneath surface and the pair of plunger assemblies are secured to the underneath surface.

* * * * *